(12) United States Patent
Snyder et al.

(10) Patent No.: US 10,686,166 B2
(45) Date of Patent: Jun. 16, 2020

(54) MULTIPLE CELL INTEGRATED CASINGS

(71) Applicant: Ford Global Technologies, LLC, Dearborn, MI (US)

(72) Inventors: Kent Snyder, Dearborn, MI (US); Alvaro Masias, Ann Arbor, MI (US); Brian Joseph Robert, Saint Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 615 days.

(21) Appl. No.: 15/016,417

(22) Filed: Feb. 5, 2016

(65) Prior Publication Data

US 2017/0229683 A1  Aug. 10, 2017

(51) Int. Cl.
| | |
|---|---|
| *H01M 2/02* | (2006.01) |
| *B60L 50/64* | (2019.01) |
| *H01M 2/06* | (2006.01) |
| *H01M 10/0525* | (2010.01) |
| *H01M 10/44* | (2006.01) |
| *H01M 10/48* | (2006.01) |
| *H01M 2/10* | (2006.01) |
| *H01M 2/30* | (2006.01) |

(52) U.S. Cl.
CPC ............. *H01M 2/024* (2013.01); *B60L 50/64* (2019.02); *H01M 2/0242* (2013.01); *H01M 2/0262* (2013.01); *H01M 2/0285* (2013.01); *H01M 2/06* (2013.01); *H01M 10/0525* (2013.01); *H01M 2/1077* (2013.01); *H01M 2/305* (2013.01); *H01M 10/441* (2013.01); *H01M 10/482* (2013.01); *H01M 2220/20* (2013.01); *Y02E 60/122* (2013.01); *Y02T 10/7005* (2013.01); *Y02T 10/7011* (2013.01); *Y02T 90/14* (2013.01)

(58) Field of Classification Search
None
See application file for complete search history.

(56) References Cited

U.S. PATENT DOCUMENTS

| | | | |
|---|---|---|---|
| 5,527,637 A * | 6/1996 | Nakazawa | B60K 17/043 180/68.5 |
| 5,630,387 A | 5/1997 | Kamiyama | |
| 6,255,015 B1 * | 7/2001 | Corrigan | H01M 2/0242 429/120 |
| 8,733,488 B2 | 5/2014 | Umetani | |
| 9,102,222 B2 | 8/2015 | Favaretto | |
| 9,123,035 B2 | 9/2015 | Penilla et al. | |
| 9,203,124 B2 | 12/2015 | Chung et al. | |
| 9,209,483 B2 | 12/2015 | Fuhr et al. | |
| 2009/0047574 A1 | 2/2009 | Hellmann | |
| 2012/0125447 A1 * | 5/2012 | Fuhr | H01M 2/0262 137/260 |

(Continued)

FOREIGN PATENT DOCUMENTS

| | | | | |
|---|---|---|---|---|
| CN | 104617244 | * | 5/2015 | ............. H01M 2/10 |
| CN | 104617244 A | | 5/2015 | |

(Continued)

*Primary Examiner* — Jeremiah R Smith

(57) ABSTRACT

The disclosure provides a battery cell casing for holding a plurality of cell elements, each electrode structure in its own compartment. The disclosed casing eliminates the need for some individual cell walls and replaces them with shared wall partitions.

19 Claims, 9 Drawing Sheets

(56) References Cited

U.S. PATENT DOCUMENTS

| | | | | |
|---|---|---|---|---|
| 2013/0052515 A1* | 2/2013 | Park | ................... | H01M 2/1077 |
| | | | | 429/159 |
| 2013/0280566 A1* | 10/2013 | Chung | ................ | H01M 2/1077 |
| | | | | 429/83 |
| 2013/0323573 A1* | 12/2013 | Tanaka | ................ | H01M 2/0242 |
| | | | | 429/154 |
| 2015/0200384 A1 | 7/2015 | Gonzales et al. | | |
| 2015/0244037 A1 | 8/2015 | Jairazbhoy et al. | | |
| 2015/0244038 A1 | 8/2015 | Jairazbhoy et al. | | |

FOREIGN PATENT DOCUMENTS

| | | |
|---|---|---|
| DE | 102013219452 A1 | 4/2014 |
| DE | 102012224370 A1 | 7/2014 |

\* cited by examiner

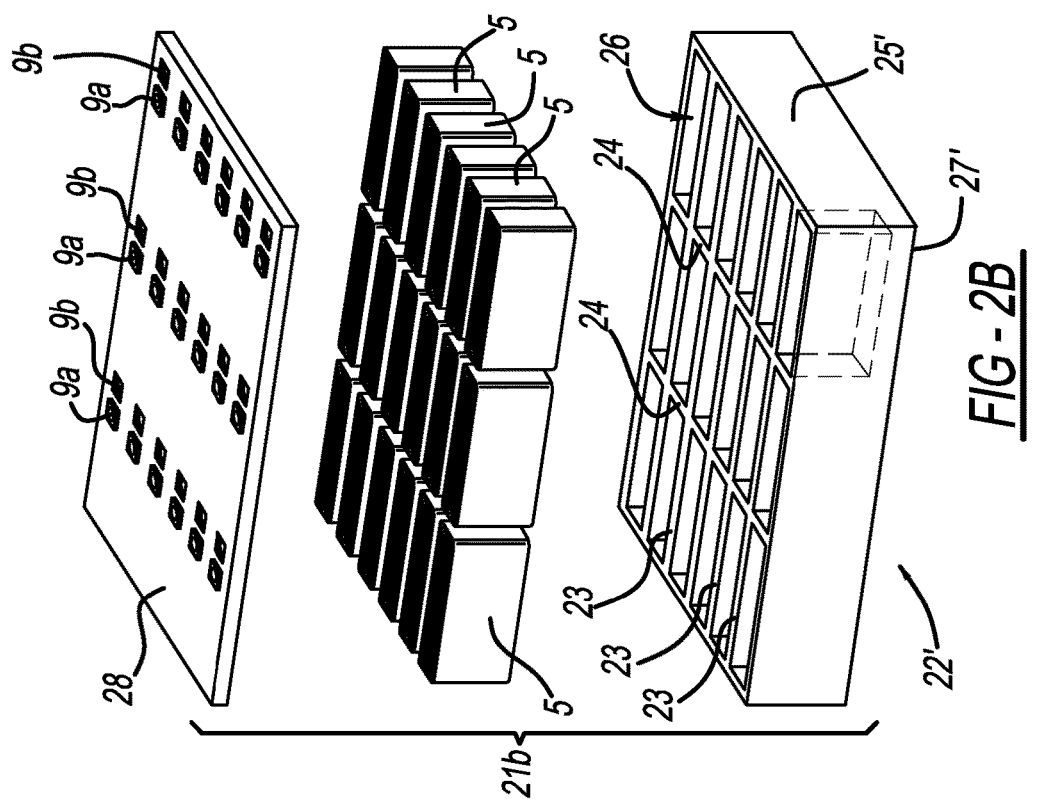
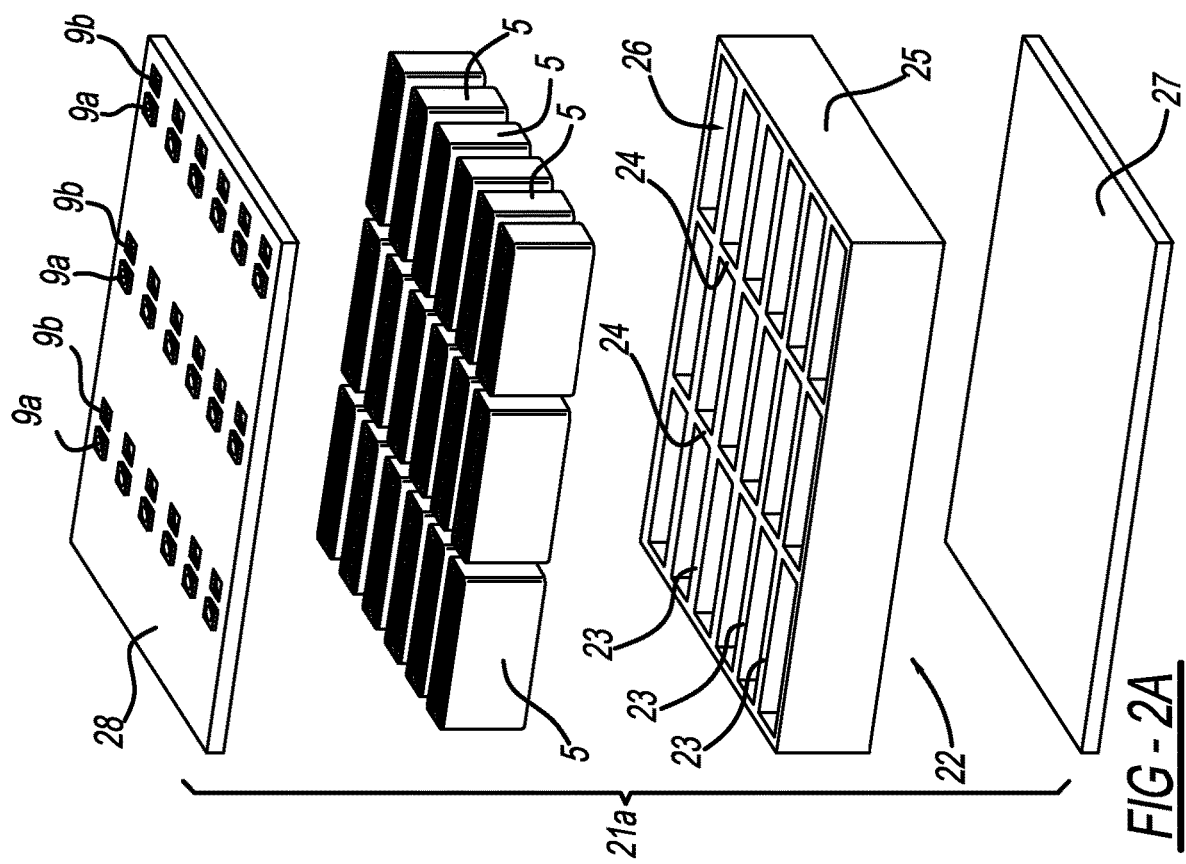

MULTIPLE CELL INTEGRATED CASINGS

FIELD OF THE INVENTION

The present application relates generally to the field of batteries and battery systems, and specifically to batteries and battery systems that may be used in electric vehicles.

BACKGROUND OF THE INVENTION

Generally, electric vehicles differ from conventional motor vehicles because electric vehicles are driven, at least in part, using one or more battery-powered electric motors. Conventional motor vehicles, by contrast, rely exclusively on an internal combustion engine to drive the vehicle. Electric vehicles may use electric motors instead of, or in addition to, the internal combustion engine.

Example electric vehicles include hybrid electric vehicles (HEVs), plug-in hybrid electric vehicles (PHEVs), fuel cell vehicles, fuel cell electric vehicles, and battery electric vehicles (BEVs). A BEV includes an electric motor, wherein the energy source for the motor is a battery that is rechargeable from an external electric grid. A HEV includes an internal combustion engine and an electric motor, wherein the energy source for the engine is fuel and the energy source for the motor is a battery. A PHEV is like a HEV, but the PHEV has a larger capacity battery that is rechargeable from the external electric grid.

Electric vehicles commonly require the usage of various specialized vehicle components, such as high voltage (HV) battery systems. HV battery systems for electric vehicles typically include one or more high voltage batteries to provide the energy required by the drive systems of such vehicles.

Owing to their high voltage, high specific energy, high energy density, low self-discharge rate, long cycle life and wide temperature operational range, prismatic lithium-ion (Li-ion) cells are widely used in HV battery systems for use in BEV, HEV, and PHEV. A prismatic Li-ion cell $1a$ typically includes a hard shell case 2 (sometimes referred to as a "can") that encloses a cell element 5 having a multi-layered material that is folded and/or wound and/or stacked to provide the cell element 5. Because of the shape of the cell element 5 that it contains, the case 2 typically has a face 3 that is longer than its side 4. The depicted prismatic Li-ion cell $1a$ has a top cover 8 and a bottom cover 7. The top cover 8 typically includes a negative electrical terminal $9a$ and positive electrical terminal $9b$.

To create battery systems for use in many electric automobiles, a plurality of individual prismatic Li-ion cells can be arranged together, typically in a face-to-face configuration (sometime referred to as a front-to-back configuration), to form an array $1b$ of individual prismatic Li-ion cells. However, such arrays can be heavy and often suffer from thermal and pressure heterogeneity. Moreover, the individual cells within such arrays are susceptible to misalignment, and non-uniform compressive forces, which can adversely affect the electrical connections between the individual cells and lead to other problems.

It is desirable to provide improved battery systems that address one or more of the deficiencies associated battery systems that are composed a plurality of single battery cells.

BRIEF SUMMARY OF THE INVENTION

An object of the invention is to provide improved battery systems that address one or more of the deficiencies associated with battery systems that are composed of a plurality of single battery cells.

The disclosed inventive concept provides a cell casing for holding a plurality of cell elements, each cell element in its own compartment. The disclosed casing eliminates the need for some individual cell walls and replaces them with shared partitions. In some embodiments, having shared partitions allows for weight savings. In some embodiments, having shared partitions allows for size/volume savings. In some embodiments, having shared partitions allows for cost savings. In some embodiments, having shared partitions allows for improved alignment of cell components and more uniform compressive forces. In some embodiments, having shared partitions allows for improved temperature uniformity and regulation. In some embodiments, owing in part to improved thermal homogeneity, having shared partitions reduces or eliminates the need for inter-cell cooling mechanisms, which may further result in volume and weight savings. In some embodiments, having shared partitions promotes improved mechanical rigidity. In some embodiments, having shared partitions eases the build process.

The above summary of the present invention is not intended to describe each embodiment or every implementation of the present invention. Advantages and attainments, together with a more complete understanding of the invention, will become apparent and appreciated by referring the attached drawings and the following detailed description of certain preferred embodiments.

BRIEF DESCRIPTION OF THE DRAWINGS

FIG. 2A, FIG. 2B, FIG. 2C, and FIG. 2D are exploded perspective views of various multiple celled batteries having shared partitions;

DETAILED DESCRIPTION OF THE PREFERRED EMBODIMENTS

Figure 1B:
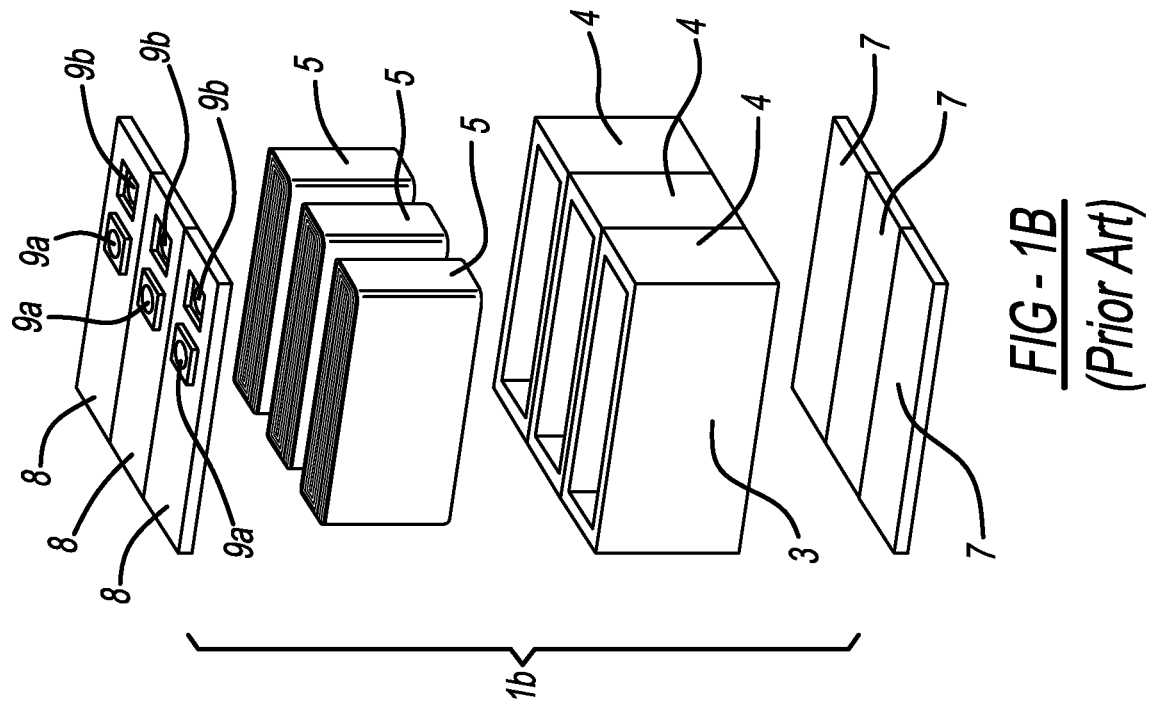
FIG. 1B is an exploded perspective view of three prismatic lithium-ion cells stacked face-to-face in an array.
Figure 1A:
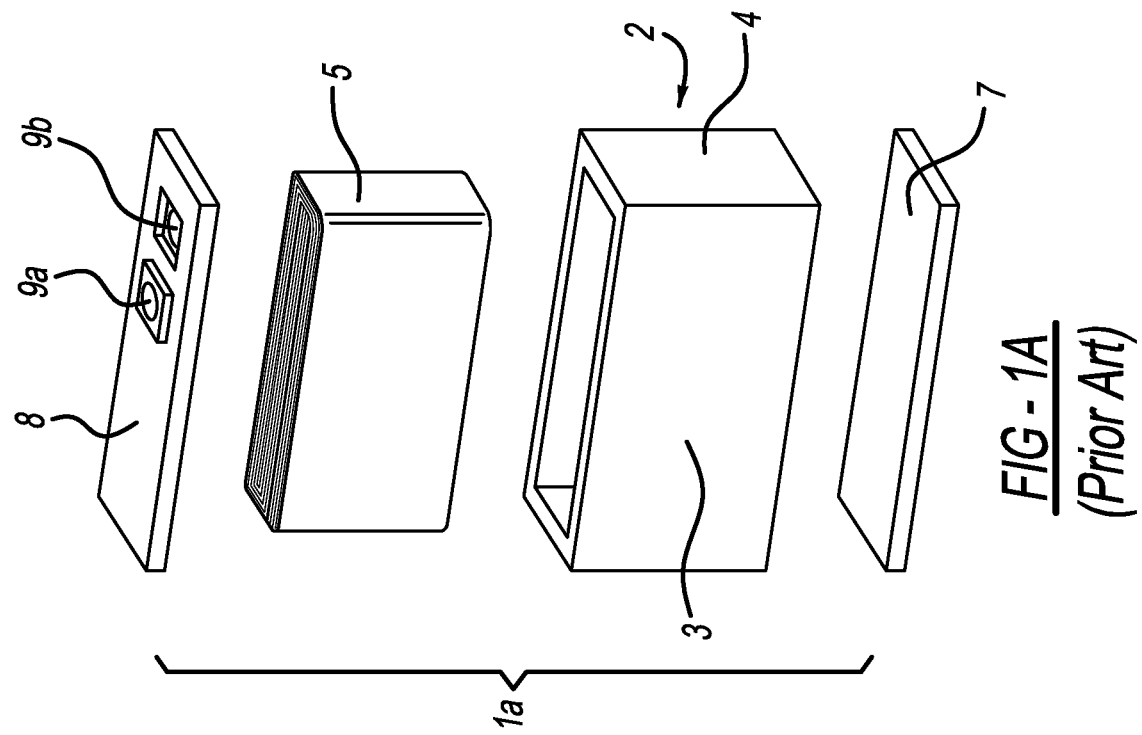
FIG. 1A is an exploded perspective view of a prismatic lithium-ion cell.

A detailed description of certain preferred embodiments of the present invention is provided in this section. The terminology used herein is for the purpose of describing particular aspects of certain preferred embodiments of the invention, and is not intended to limit the scope of the claimed invention, which will be limited only by the appended claims. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Unless defined otherwise, all technical and scientific terms used herein have the same meanings as commonly understood by a person skilled in the art to which this invention pertains.

FIG. 2A depicts a partially exploded view of one embodiment of a multi-cell lithium-ion battery 21a. The embodiment depicted in FIG. 2A comprises a frame 22 that includes an outer wall 25 and twenty-seven (27) partitions, which together divide the interior into eighteen (18) compartments 26. Of those twenty-seven (27) partitions, fifteen (15) are face-to-face partitions 23, and twelve (12) are side-by-side partitions 24. A lithium-ion cell element 5 is disposed within each of the compartments 26. In the embodiment depicted in FIG. 2A, a case is formed by bottom wall 27, outer wall 25 of frame 22, and top cover 28. Electrolyte is also disposed within each of the compartments 26. The top cover 28 of the embodiment depicted in FIG. 2A includes one negative electrical terminal 9a for each lithium-ion cell element 5 and one positive electrical terminal 9b for each lithium-ion cell element 5, for a total of eighteen (18) negative electrical terminals and eighteen (18) positive electrical terminals.

In some embodiments, the bottom wall and the outer wall are formed as a single unit. An example of such an embodiment is the multi-cell lithium-ion battery 21b depicted in FIG. 2B. In the embodiment depicted in FIG. 2B, a case is formed by top cover 28, outer wall 25' of frame 22', and bottom wall portion 27' of frame 22'. Although FIG. 2B depicts an embodiment having eighteen (18) compartments 26, many different numbers of compartments and arrangements of compartments are contemplated.

Figure 2C:
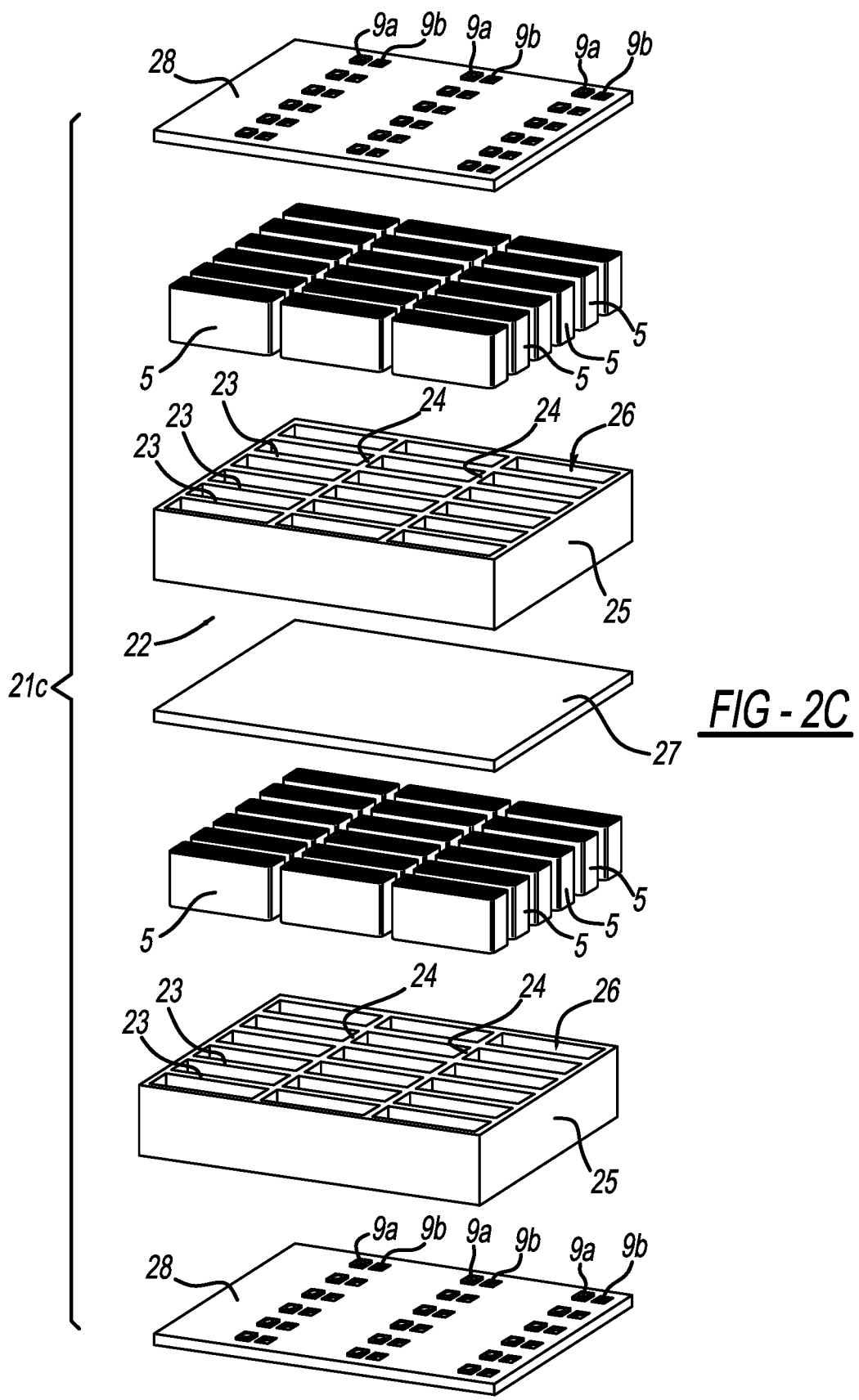

It is to be understood that the bottom wall 27 illustrated in FIG. 2A, or the bottom wall portion 27' of frame 22' illustrated in FIG. 2B, may be shared by another layer of cells underneath. For example, FIG. 2C depicts a partially exploded view of one embodiment of a multi-cell lithium-ion battery 21c that includes a second layer of cells. In the embodiment depicted in FIG. 2C, a case is formed by bottom wall 27, outer walls 25 of frames 22, and covers 28. Although FIG. 2C depicts an embodiment having thirty-six (36) compartments 26 (with eighteen (18) compartments on the upper layer, and eighteen (18) compartments on the lower layer), many different numbers of compartments and arrangements of compartments are contemplated. For example, in some embodiments, the case comprises an upper layer and a lower layer, wherein the upper layer comprises at least two compartments and the lower layer comprises at least two compartments. In some embodiments, the case comprises an upper layer and a lower layer, wherein the upper layer comprises at least three compartments and the lower layer comprises at least three compartments. In some embodiments, the case comprises an upper layer and a lower layer, wherein the upper layer comprises at least four compartments and the lower layer comprises at least four compartments. In some embodiments, the case comprises an upper layer and a lower layer, wherein the upper layer comprises at least six compartments and the lower layer comprises at least six compartments. In some embodiments, the case comprises an upper layer and a lower layer, wherein the upper layer comprises at least eight compartments and the lower layer comprises at least eight compartments. The terms "upper layer" and "lower layer" are used herein merely for ease of visualization and are not intended to limit the orientation of the battery when in use. In some applications, it may be preferable for a multi-layer battery to be rotated such that the "upper layer" and "lower layer" as depicted in FIG. 2C are oriented side-by-side. Moreover, embodiments comprising more than two layers of cells are also contemplated.

Figure 2D:
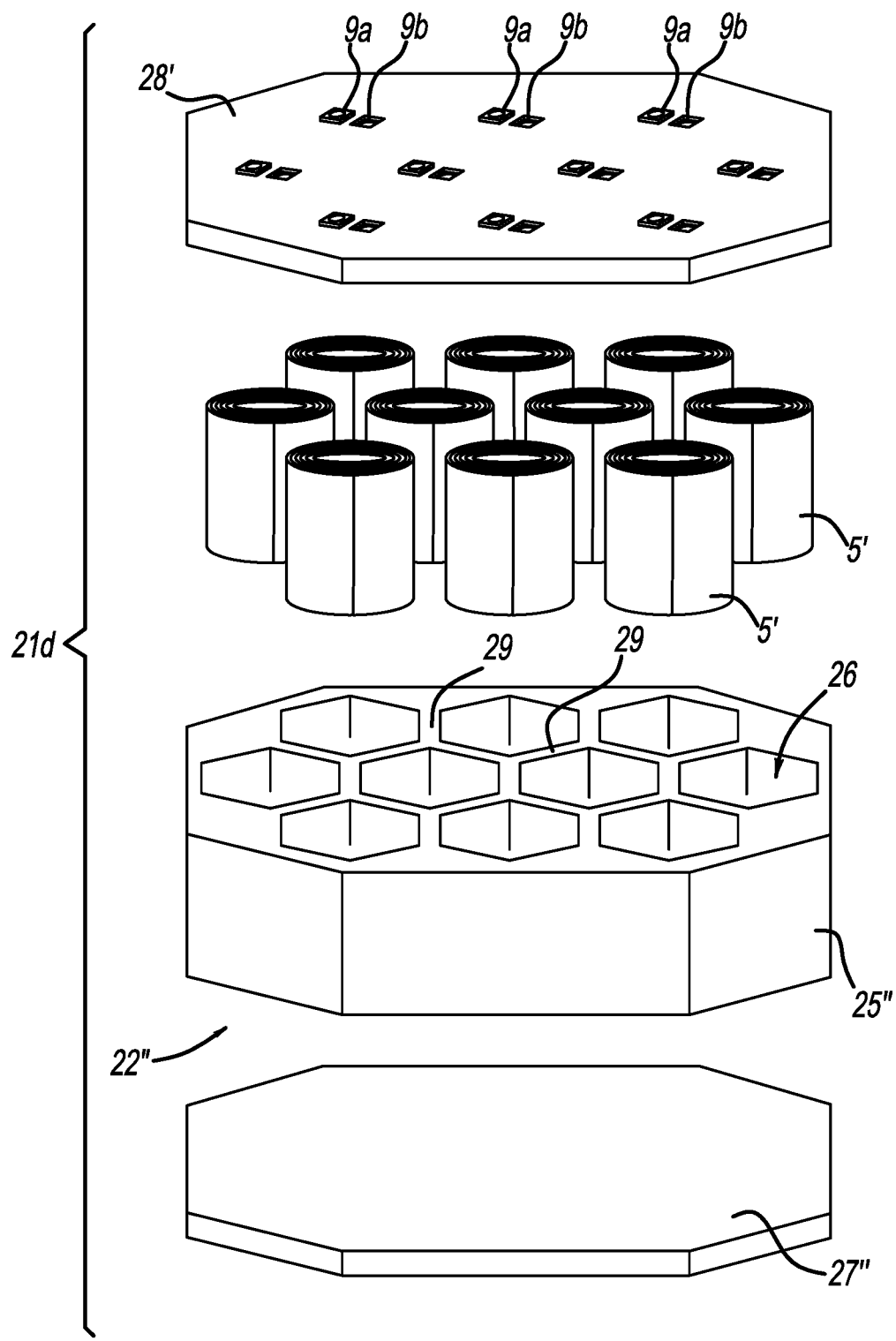

It is to be understood that the partition itself may form any one of several patterns. Such patterns might include, without limitation, a honeycomb partition pattern that may be hexagonal to accommodate cylindrical cell types. For example, FIG. 2D depicts a partially exploded view of one embodiment of a multi-cell lithium-ion battery 21d that includes a honeycomb partition pattern. The embodiment depicted in FIG. 2D comprises a frame 22" that includes an outer wall 25" and honeycomb partitions 29, which together divide the interior into ten (10) compartments 26. In the embodiment depicted in FIG. 2D, a case is formed by bottom wall 27", outer wall 25" of frame 22", and top cover 28'. A lithium-ion cell element 5 is disposed within each of the compartments 26. Electrolyte is also disposed within each of the compartments 26. The top cover 28' of the embodiment depicted in FIG. 2D includes one negative electrical terminal 9a for each lithium-ion cell element 5 and one positive electrical terminal 9b for each lithium-ion cell element 5, for a total of ten (10) negative electrical terminals and ten (10) positive electrical terminals. Although FIG. 2D depicts an embodiment having ten (10) compartments 26, many different numbers of compartments and arrangements of compartments are contemplated. For example, bottom wall 27" illustrated in FIG. 2D, or the bottom portion of a frame that corresponds to bottom wall 27" illustrated in FIG. 2D, may be shared by another layer of cells underneath.

In some embodiments, a single piece of material, such as a single piece of metal, comprises two or more partitions. For example, in some embodiments, a single piece of metal comprises the two (2) face-to-face partitions 23 found in a 2×2 configuration 322. Similarly, in some embodiments, a single piece of material, such as a single piece of metal, comprises at least one partition and also comprises part of, or all of, the outer wall 25. Preferred methods for forming components from a single sheet of metal include deep-drawn metal processes. Extrusion processes are also among preferred methods. In some embodiments, the outer wall and at least one partition are formed from a single piece of material, such as a single sheet of metal. In some embodiments, the partitions are configured within the case to prevent transfer of the electrolyte between the compartments. Alternative arrangements to accommodate electrolyte flow to enter and leave individual cells in the battery may be made without deviating from the scope and spirit of the invention as described.

In some embodiments, the partitions (including face-to-face partitions 23, side-by-side partitions 24, and honeycomb partitions 29) are metallic partitions. In some embodiments, the partitions are composed of a metallic material selected from the group consisting of: aluminum, aluminum alloy, stainless steel, carbon steel, alloy steel, magnesium, magnesium alloy, titanium, titanium alloy. In some embodiments, the partitions are composed of metalized carbon-fiber. The case and partitions need not be constructed from the same materials. In some embodiments, the partitions are composed of the same material as the case, or portions of the case. In some embodiments, the case, or portions of the case, is composed of a metallic material. In some embodiments, the case, or portions of the case, is composed of a metallic material selected from the group consisting of: aluminum, aluminum alloy, stainless steel, carbon steel, alloy steel, magnesium, magnesium alloy, titanium, titanium alloy. In some embodiments, the case, or portions of the case, is composed of metalized carbon-fiber.

Although FIG. 2A, FIG. 2B, and FIG. 2D depict batteries that are oriented such that their terminals are on the top of the case, in some embodiments, the batteries are oriented such that their terminals are located elsewhere. For example, in some embodiments, the batteries are oriented such that their terminals are located on the side, thereby allowing, for example, easier management of the terminals.

To promote thermal homogeneity, some embodiments employ highly thermally conductive material. In some embodiments, the partitions are composed of a metallic material having a thermal conductivity of at least 10 W/(m K). In some embodiments, the metallic partitions are composed of a metallic material having a thermal conductivity of at least 20 W/(m K). In some embodiments, the metallic partitions are composed of a metallic material having a thermal conductivity of at least 40 W/(m K). In some embodiments, the metallic partitions are composed of a metallic material having a thermal conductivity of at least 100 W/(m K). In some embodiments, the metallic partitions are composed of a metallic material having a thermal conductivity of at least 200 W/(m K). In some embodiments, the metallic partitions are composed of aluminum, which has a thermal conductivity greater than 200 W/(m K). In some embodiments, a partition is composed of aluminum or aluminum alloy, and the partition has a thickness of at least 0.53 mm, but not more than 0.75 mm.

Although FIG. 2A, FIG. 2B, FIG. 2C, and FIG. 2D each depict a single top cover that covers an entire frame, other configurations are also contemplated. For example, in some embodiments, the top of each compartment 26 is covered by its own top cover. In some embodiments, the top cover and the frame are formed as a single unit. In some embodiments, the top cover and the frame are formed from a single piece of material, such as a single piece of metal. Although FIG. 2A, FIG. 2C, and FIG. 2D each depict a single bottom cover for the entire frame, other configurations are also contemplated. For example, in some embodiments, the bottom of each compartment 26 is covered by its own bottom cover.

Although FIG. 2A, FIG. 2B, FIG. 2C, and FIG. 2D depict configurations having one negative electrical terminal 9a for each lithium-ion cell element 5 and one positive electrical terminal 9b for each lithium-ion cell element 5, other configurations are also contemplated. For example, in some embodiments, one negative electrical terminal 9a may connect, either in parallel or in serial, to multiple lithium-ion cell elements 5, thereby reducing the ratio of negative electrical terminals 9a to lithium-ion cell elements 5. In some embodiments, one positive electrical terminal 9b may connect, either in parallel or in serial, to multiple lithium-ion cell elements 5, thereby reducing the ratio of positive electrical terminals 9b to lithium-ion cell elements 5. Although the top cover is a preferred location for negative electrical terminals 9a and positive electrical terminals 9b, as one of skill in the art would appreciate, other locations, including other locations on the case, are possible. For example, in some embodiments, the entire outer case may function as a positive electrical terminal 9b.

Figure 3:
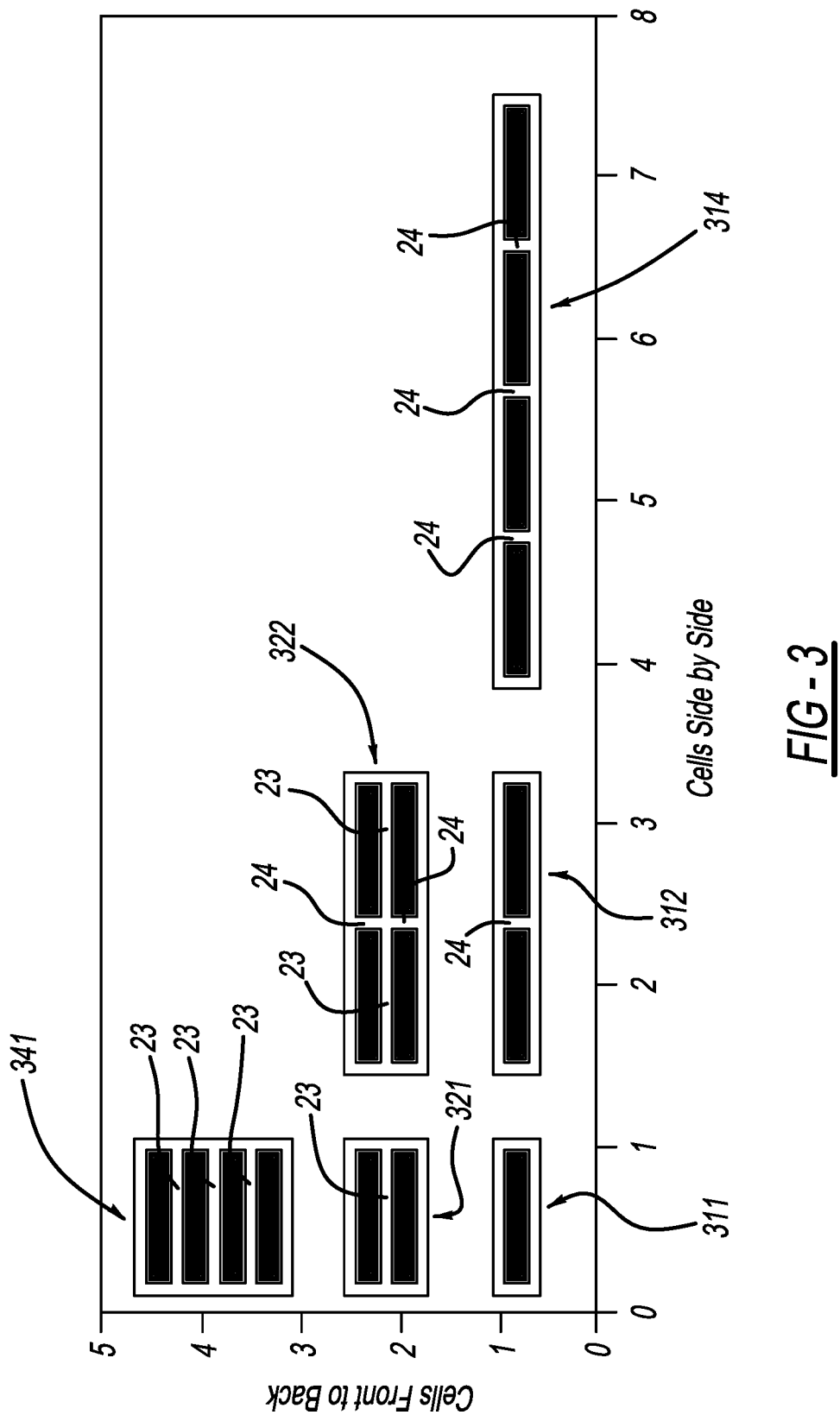
FIG. 3 is a top view of various multiple celled batteries having shared partitions.
Figure 4A:
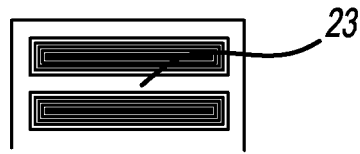
FIG. 4A, FIG. 4B, and FIG. 4C illustrate various configurations for multiple celled batteries having shared partitions.
Figure 4A:
Figure 4B:
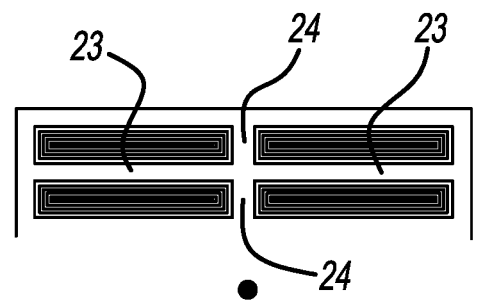
Figure 4B:
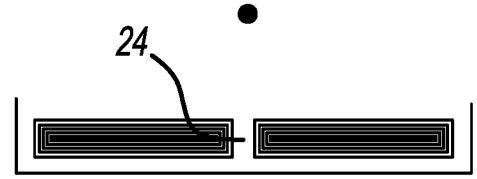
Figure 4C:
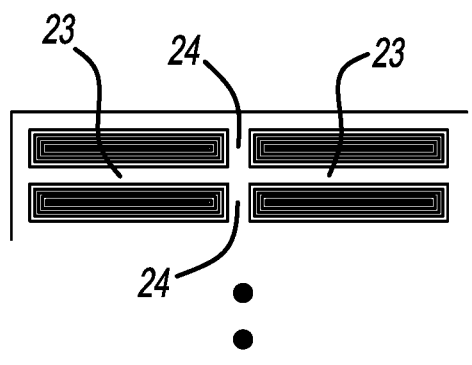
Figure 4C:
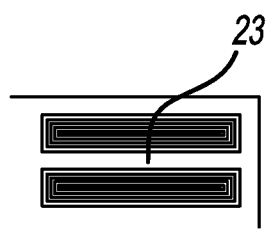
Figure 4C:
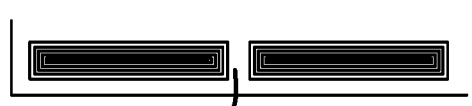
Figure 4C:

Although FIG. 2A, FIG. 2B, FIG. 2C, and FIG. 2D depict batteries comprising lithium-ion cell elements, other rechargeable cell elements may be employed without deviating from the scope and spirit of the invention as described. Examples of other suitable rechargeable cell elements include, but are not limited to, nickel-cadmium (NiCd) and nickel-metal hydride (NiMH) cell elements. Additional suitable rechargeable cell elements include, but are not limited to, cells using sodium or magnesium as a charge carrier, Although FIG. 2A depicts an embodiment having eighteen (18) compartments 26 arranged in a 6×3 configuration, many different numbers of compartments and arrangements of compartments are contemplated. For example, FIG. 3 depicts the following additional embodiments: a 4×1 configuration 341, having four (4) compartments, and three (3) face-to-face partitions 23; a 2×1 configuration 321, having two (2) compartments, and one (1) face-to-face partition 23; a 2×2 configuration 322, having four (4) compartments, two (2) face-to-face partitions 23, and two (2) side-by-side partitions 24; a 1×2 configuration 312, having two (2) compartments, and one (1) side-by-side partition 24; and a 1×4 configuration 314, having four (4) compartments, and three (3) side-by-side partitions 24. Shown only for comparison and not intended to portray a claimed embodiment, a single compartment configuration 311, which does not have any face-to-face partitions and does not have any side-by-side partitions, is also depicted in FIG. 3. FIG. 4A depicts embodiments having at least three (3) compartments, and at least two (2) face-to-face partitions 23. FIG. 4B depicts embodiments having at least six (6) compartments, at least four (4) face-to-face partitions 23, and at least three (3) side-by-side partitions 24. FIG. 4C depicts embodiments having at least nine (9) compartments, at least six (6) face-to-face partitions 23, and at least six (6) side-by-side partitions 24.

Figure 5:
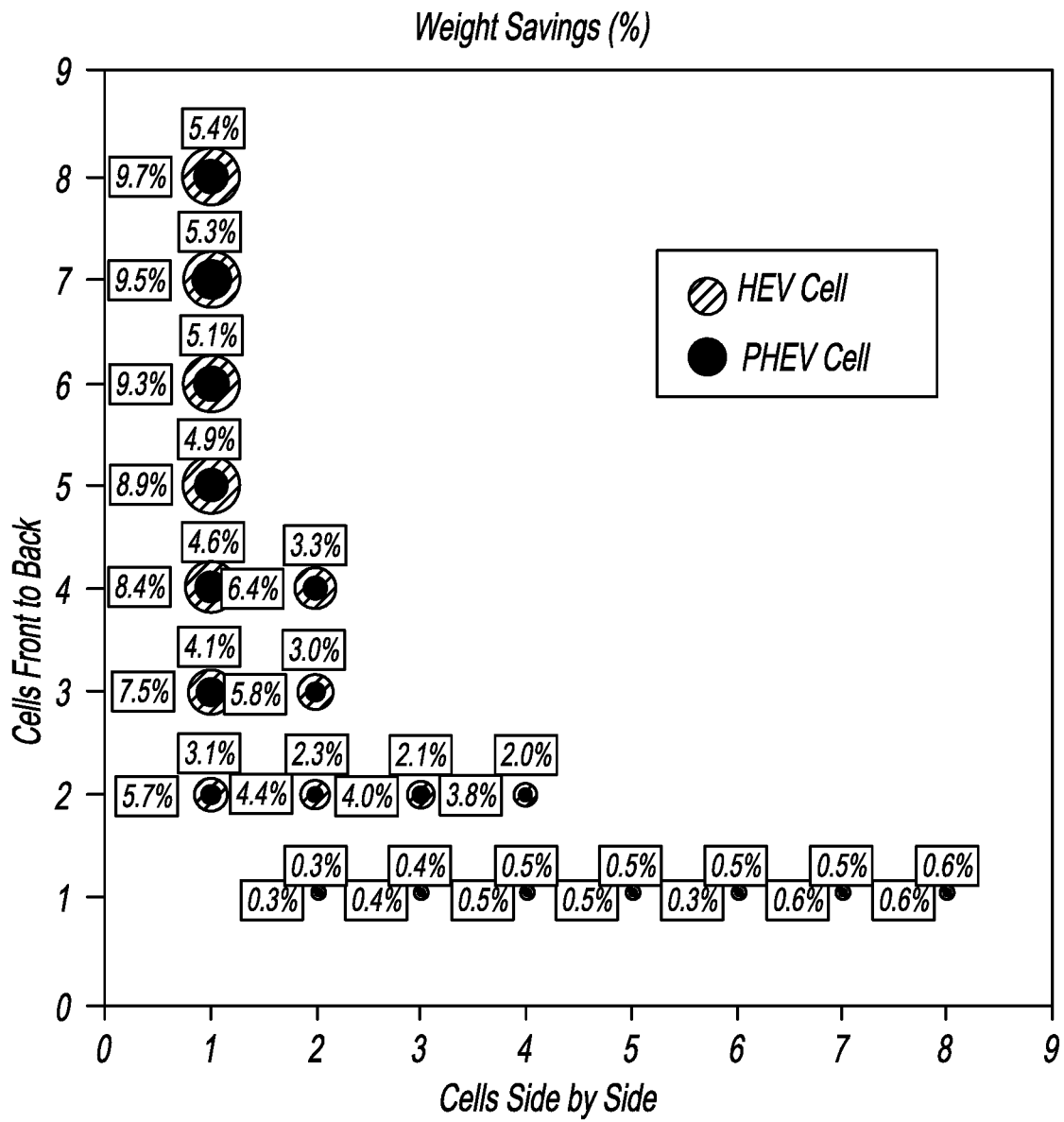
FIG. 5 is a chart showing example weight savings resulting from utilizing shared walls.

FIG. 5 summarizes the weight savings opportunities for various face-to-face (front-to-back) and side-by-side combinations. The boxed number immediately above each data point illustrates the approximate weight savings stemming from using shared walls for a given multi-HEV cell configuration, and the boxed number to the immediate left of each data point illustrates the approximate weight savings stemming from using shared walls for a given multi-PHEV cell configuration. For example, owing in part to the shared walls, a multi-HEV configuration having eight cells, all configured face-to-face (front-to-back), would be expected to weigh approximately 9.7% less than would eight individual HEV cells. Various designs are contemplated, however, face-to-face designs yield the greatest opportunity for weights savings.

Figure 6:
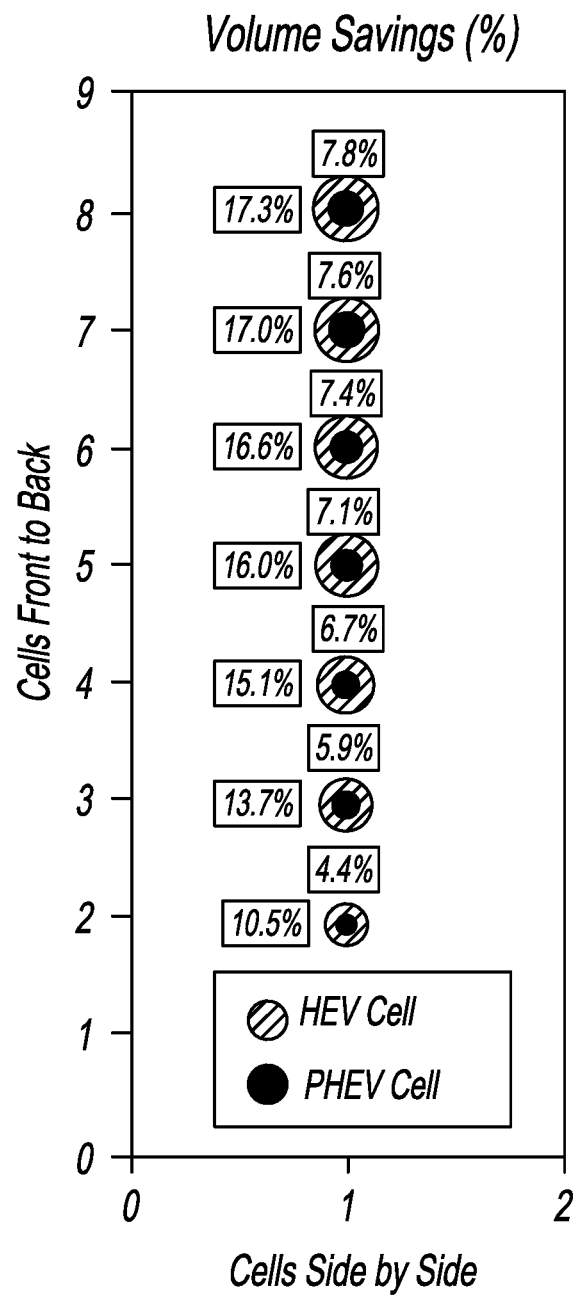
FIG. 6 is a chart showing example volume savings resulting from utilizing shared walls.

FIG. 6 summarizes the volume savings opportunities for various face-to-face (front-to-back) and side-by-side combinations. The boxed number immediately above each data point illustrates the approximate volume savings stemming from using shared walls for a given multi-HEV cell configuration, and the boxed number to the immediate left of each data point illustrates the approximate volume savings stemming from using shared walls for a given multi-PHEV cell configuration. For example, a multi-HEV configuration having eight cells, all configured face-to-face (front-to-back), would be expected to displace about 17.3% less volume than would eight individual HEV cells in a some configurations.

Figure 7:
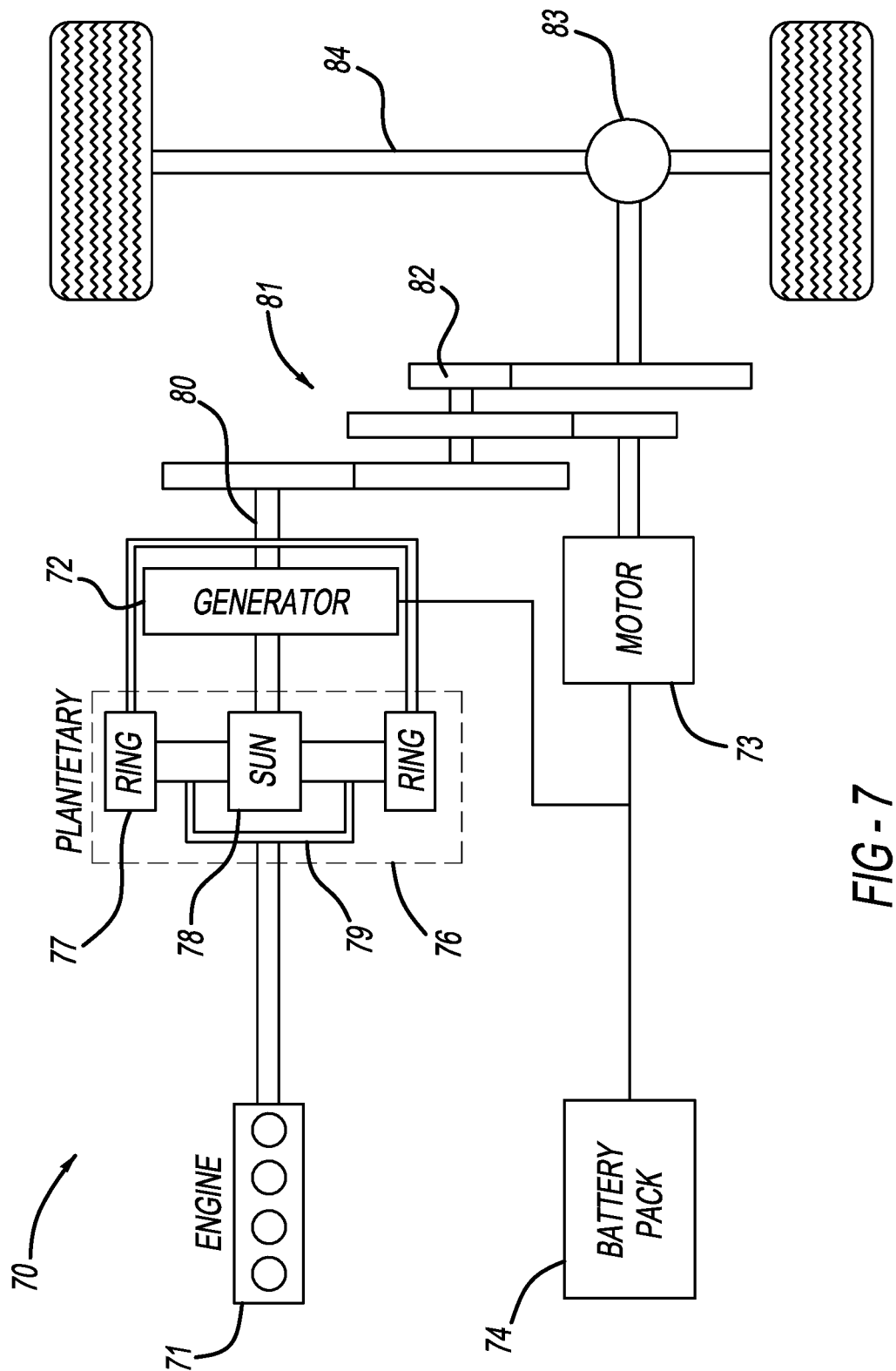
FIG. 7 illustrates a schematic view of a powertrain of an example electric vehicle.

FIG. 7 schematically illustrates a powertrain 70 for an electric vehicle. Although depicted as a hybrid electric vehicle (HEV), it should be understood that the concepts described herein are not limited to HEVs and could extend to other electrified vehicles, including, but not limited to, plug-in hybrid electric vehicles (PHEVs), fuel cell electric vehicles, and battery electric vehicles (BEVs).

In one embodiment, the powertrain 70 is a powersplit powertrain system that employs a first drive system and a second drive system. The first drive system includes a combination of an engine 71 and a generator 72 (i.e., a first electric machine). The second drive system includes at least a motor 73 (i.e., a second electric machine), the generator 72, and a battery pack 74, which comprises one or more multi-cell lithium-ion batteries. In this example, the second drive system is considered an electric drive system of the powertrain 70. The first and second drive systems generate torque to drive one or more sets of vehicle drive wheels of the electric vehicle.

The engine 71, which is an internal combustion engine in this example, and the generator 72 may be connected through a power transfer unit 76, such as a planetary gear set. Of course, other types of power transfer units, including other gear sets and transmissions, may be used to connect the engine 71 to the generator 72. In one non-limiting embodiment, the power transfer unit 76 is a planetary gear set that includes a ring gear 77, a sun gear 78, and a carrier assembly 79.

The generator 72 can be driven by engine 71 through the power transfer unit 76 to convert kinetic energy to electrical energy. The generator 72 can alternatively function as a motor to convert electrical energy into kinetic energy, thereby outputting torque to a shaft 80 connected to the power transfer unit 76. Because the generator 72 is operatively connected to the engine 71, the speed of the engine 71 can be controlled by the generator 72.

The ring gear 77 of the power transfer unit 76 may be connected to a shaft 80, which is connected to vehicle drive wheels through a second power transfer unit 81. The second power transfer unit 81 may include a gear set having a plurality of gears 82. Other power transfer units may also be suitable. The gears 82 transfer torque from the engine 71 to a differential 83 to ultimately provide traction to the vehicle drive wheels. The differential 83 may include a plurality of gears that enable the transfer of torque to the vehicle drive wheels. In this example, the second power transfer unit 81 is mechanically coupled to an axle 84 through the differential 83 to distribute torque to the vehicle drive wheels.

The motor 73 (i.e., the second electric machine) can also be employed to drive the vehicle drive wheels by outputting torque to a shaft that is also connected to the second power transfer unit 81. In one embodiment, the motor 73 and the generator 72 cooperate as part of a regenerative braking system in which both the motor 73 and the generator 72 can be employed as motors to output torque. For example, the motor 73 and the generator 72 can each output electrical power to the battery pack 74.

The battery pack 74 is an electric vehicle battery systems. The battery pack 74 may have the form of a high voltage battery that is capable of outputting electrical power to operate the motor 73 and the generator 72. Other types of energy storage devices and/or output devices can also be used with the electric vehicle having the powertrain 70.

The following claims particularly point out certain combinations and sub-combinations regarded as novel and non-obvious. The invention described and claimed herein is not to be limited in scope by the specific embodiments or examples herein disclosed. Rather, the embodiments and examples are intended as mere illustrations of several aspects of the invention. The preferred embodiments and examples can be altered to provide other embodiments of the disclosed invention. Any equivalent embodiments are intended to be within the scope of this invention. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A multi-cell rechargeable battery, comprising:
a case including an upper layer having an upper cover, a lower layer having a lower cover, and a single shared intermediate wall between the upper layer and the lower layer, the case further containing one or more directly adjacent partitions dividing the interior of the case into a plurality of cell compartments, the directly adjacent partitions being perpendicular to one another, each cell compartment having a pair of side walls and a pair of face walls, each cell compartment sharing at least one side wall and at least one face wall with an adjacent compartment, at least two cell compartments being provided on each of the upper and lower layers;
a plurality of electrical terminals comprising a plurality of upper terminals associated with the upper layer and a plurality of lower terminals associated with the lower layer, wherein the partitions are composed of a metallic material or a metalized material; and
a rechargeable cell element disposed within each of the compartments of the case.

2. The multi-cell rechargeable battery of claim 1, wherein the rechargeable cell element is selected from the group consisting of: a lithium-ion cell element, a nickel-cadmium cell element, and a nickel-metal hydride cell element.

3. The multi-cell rechargeable battery of claim 2, wherein the partitions are composed of a metallic material or a metalized material.

4. The multi-cell rechargeable battery of claim 3, wherein the metallic material or metalized material is selected from the group consisting of: aluminum, aluminum alloy, stainless steel, carbon steel, alloy steel, magnesium, magnesium alloy, titanium, titanium alloy, and metalized carbon-fiber.

5. The multi-cell rechargeable battery of claim 3, wherein the metallic material has a thermal conductivity of at least 10 W/(m K).

6. The multi-cell rechargeable battery of claim 3, wherein the metallic material is aluminum or aluminum ally, and wherein each partition has a thickness of at least 0.53 mm, but not more than 0.75 mm.

7. The multi-cell rechargeable battery of claim 3, wherein the rechargeable cell element is a lithium-ion cell element.

8. The multi-cell rechargeable battery of claim 2, wherein the partitions are configured within the case to prevent transfer of an electrolyte between the compartments.

9. The multi-cell rechargeable battery of claim 2, wherein the case comprises an upper layer and a lower layer, and wherein the upper layer comprises at least two cell compartments and the lower layer comprises at least two cell compartments.

10. An electric vehicle, the electric vehicle comprising the multi-cell rechargeable battery of claim 1.

11. A multi-cell rechargeable battery, comprising:
a case including an upper layer having an upper cover, a lower layer having a lower cover, and a single shared intermediate wall between the upper layer and the lower layer, the case further containing at least a pair of perpendicular partitions dividing the interior of the case into a plurality of cell compartments, each cell compartment having a pair of side walls and a pair of face walls, each cell compartment sharing at least one side wall and at least one face wall with an adjacent cell compartment, the at least one side wall and the at least one face wall being directly adjacent and perpendicular to one another, at least two cell compartments being provided on each of the upper and lower layers;

a rechargeable cell element disposed within each of the cell compartments of the case; and a plurality of electrical terminals comprising a plurality of upper terminals associated with the upper layer and a plurality of lower terminals associated with the lower layer, wherein the partitions are composed of a metallic material or a metalized material, wherein the case comprises an upper lay and a lower layer separated by a single shared intermediate wall, the upper layer comprising at least two cell compartments and the lower layer comprising at least two cell compartments.

12. The multi-cell rechargeable battery of claim 11, wherein the rechargeable cell element is selected from the group consisting of: a lithium-ion cell element, a nickel-cadmium cell element, and a nickel-metal hydride cell element.

13. The multi-cell rechargeable battery of claim 12, wherein the upper layer comprises at least three cell compartments and the lower layer comprises at least three cell compartments.

14. The multi-cell rechargeable battery of claim 12, wherein the partitions are composed of a metallic material or a metalized material.

15. The multi-cell rechargeable battery of claim 14, wherein the metallic material or metalized material is selected from the group consisting of: aluminum, aluminum alloy, stainless steel, carbon steel, alloy steel, magnesium, magnesium alloy, titanium, titanium alloy, and metalized carbon-fiber.

16. The multi-cell rechargeable battery of claim 14, wherein the metallic material has a thermal conductivity of at least 10 W/(m K).

17. The multi-cell rechargeable battery of claim 12, wherein the rechargeable cell element is a lithium-ion cell element.

18. A multi-cell lithium-ion battery, comprising:

a case containing one or more partitions dividing the interior of the case into a plurality of cell compartments;

a lithium-ion cell element disposed within each of the compartments of the case; and a plurality of electrical terminals comprising a plurality of upper terminals and a plurality of lower terminals, wherein the partitions are composed of a metallic material or a metalized material, wherein the case comprises an upper layer having an upper cover including the plurality of upper terminals and a lower layer having a lower cover including the plurality of lower terminals separated by a single shared intermediate wall, the upper layer comprising at least two cell compartments sandwiched between the single shared intermediate wall and the upper cover and the lower layer comprising at least two cell compartments sandwiched between the single shared intermediate wall and the lower cover.

19. The multi-cell rechargeable battery of claim 18, wherein the metallic material or metalized material is selected from the group consisting of: aluminum, aluminum alloy, stainless steel, carbon steel, alloy steel, magnesium, magnesium alloy, titanium, titanium alloy, and metalized carbon-fiber.

* * * * *